Dec. 9, 1952 R. M. LEHMAN 2,620,767
FILLER MACHINE
Filed Sept. 20, 1951 2 SHEETS—SHEET 1
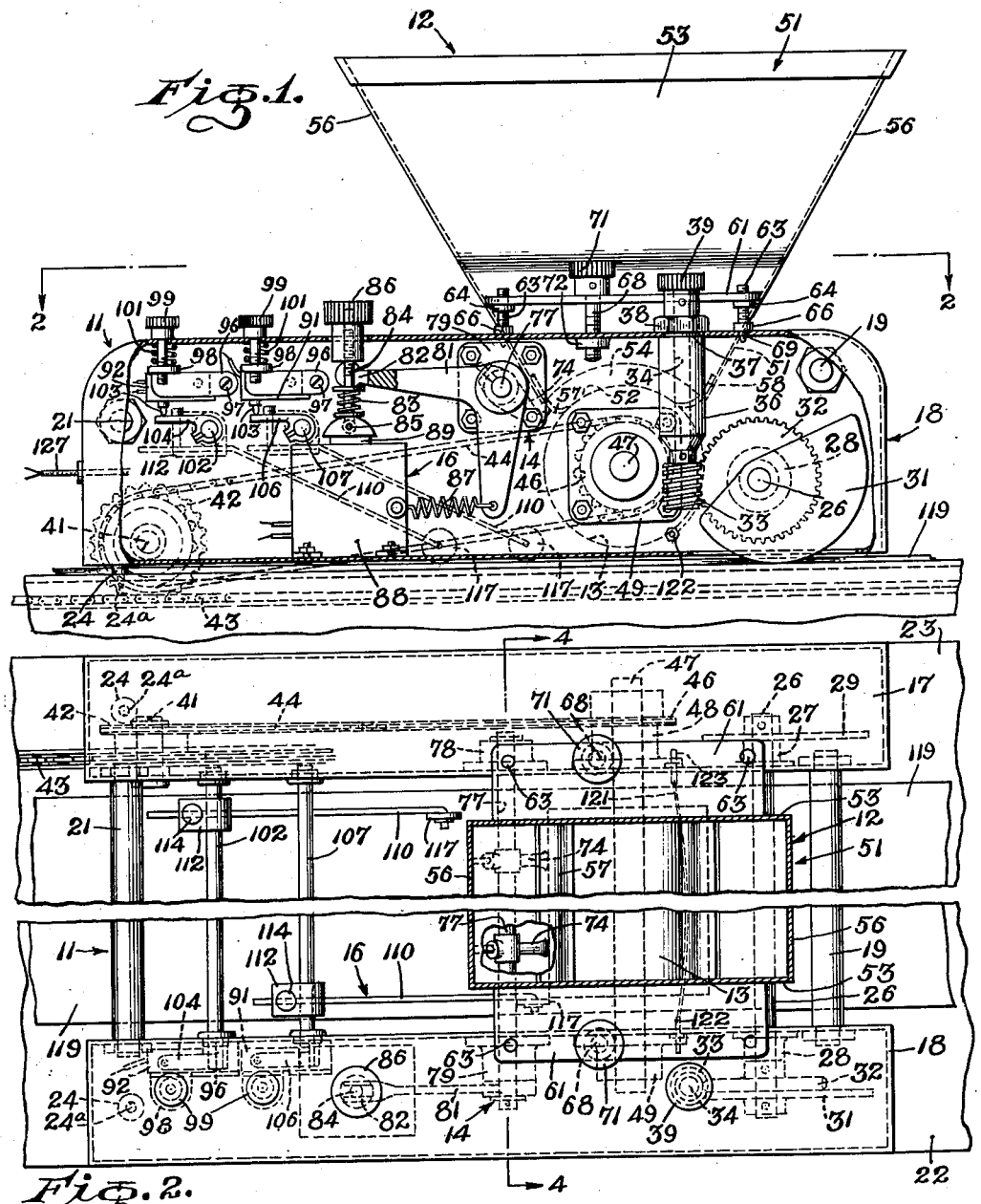
INVENTOR
Robert M. Lehman
BY
Attorney.

Dec. 9, 1952  R. M. LEHMAN  2,620,767
FILLER MACHINE
Filed Sept. 20, 1951  2 SHEETS—SHEET 2
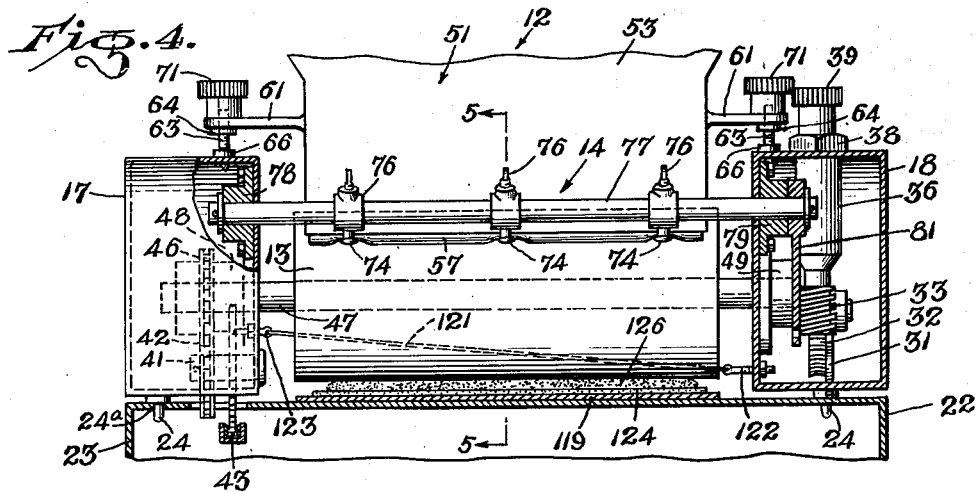
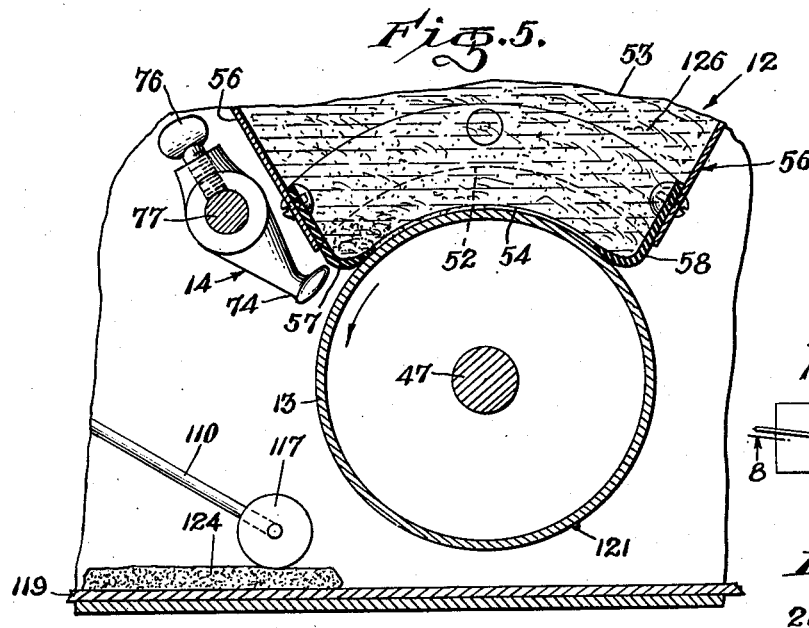
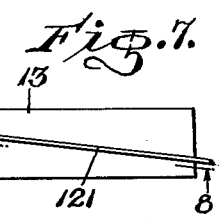
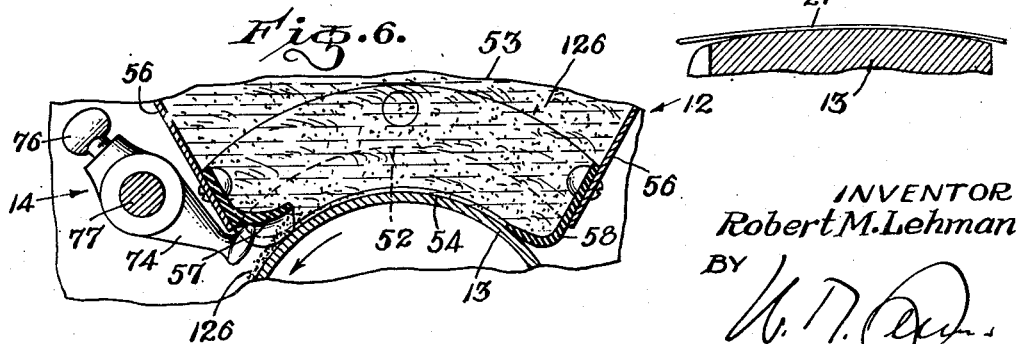
INVENTOR
Robert M. Lehman
BY
Attorney.

Patented Dec. 9, 1952

2,620,767

UNITED STATES PATENT OFFICE 2,620,767

FILLER MACHINE

Robert M. Lehman, Altadena, Calif.

Application September 20, 1951, Serial No. 247,459

1 Claim. (Cl. 118—2)

The present invention relates to an apparatus for appying filler to bakery goods such as jelly rolls, coffee rolls and the like. More specifically the invention comprises a machine for applying filler of various kinds to separate batches of dough of uniform size and weight.

In the making of jelly rolls, coffee rolls and the like the dough is first shaped into a plurality of separate flat rectangular units and then each is processed through a series of operations to make the final product. The operations include application of filler, folding or rolling the filler-covered product, cutting the rolled product, and finally placing the completed products in pans for baking. Formerly these operations were all performed manually. In an apparatus to perform the operations automatically a frame of two parallel longitudinal members spaced by tie rods and supported by leg members carries a conveyer belt which encircles rollers positioned transversely between the two frame members, the rollers being equipped to take power from a common belt or chain driven by an electric motor. Various superstructures comprising the filling, folding and cutting units are detachably mounted in spaced relationship along the longitudinal frame members and over the conveyer belt, being arranged in the order the desired operations are to take place on the pieces of dough. The separate dough pieces are deposited from a hopper, or by other suitable means, on the conveyer belt and successively conveyed to the various units where the filling, folding and cutting operations are performed sequentially. In each case of filling, folding or cutting the respective unit concerned is actuated and performs its function in response to the passage of the dough piece thereunder on the conveyer belt. A machine of the type described comprising the frame and superstructures just described is disclosed in my co-pending application for Bakery Apparatus, Serial No. 735,070. The invention disclosed in the present application comprises a particular filler unit adapted to be embodied in the apparatus disclosed in said prior application.

It is an object of this invention to provide an improved apparatus for the application of filler to dough pieces in the making of bakery products.

A further object of this invention is to provide an improved apparatus for the selective application of filler to separate flat rectangular units of dough passing in succession through the apparatus.

Still a further object of this invention is to provide a fully automatic apparatus for the application of filler to dough products in which the filler unit is actuated and performs its function in response to the passage of dough units through the apparatus.

A further object of the invention is the provision of a filler unit for applying filler to dough units prior to baking in which the area of application of the filler to the surface of the dough can be selectively controlled.

Another object of the invention is the provision of a filler unit for applying filler to dough units by which the filler may be applied to the dough and spaced at predetermined distances from its marginal edges.

These and other more specific objects will appear upon reading the following specification and claim and upon considering in connection therewith the attached drawings to which they relate.

Referring now to the drawings in which a preferred embodiment of the invention is illustrated:

Figure 1 is a side view of an embodiment of the apparatus constructed in accordance with the present invention partially cut away to show the dough-actuated control;

Figure 2 is a top view of the apparatus shown in Figure 1, the hopper being shown in section upon the line 2—2 of that figure;

Figure 3 is an electrical wiring diagram of the electric circuit utilized in the filler apparatus;

Figure 4 is a vertical transverse section of the apparatus taken on line 4—4 of Figure 2;

Figure 5 is a partial sectional view taken on line 5—5 of Figure 4 and shows the filler-retaining flaps in their sealing relationship to the roller and the flap-actuating finger in its normal inoperative position;

Figure 6 is a partial sectional view taken at the same point as Figure 5 but showing the feeding flap and one of its actuating fingers positioned to direct filler to the passing dough unit;

Figure 7 is a detail view of the roller and its stripper wire; and

Figure 8 is a sectional view upon the line 8—8 of Figure 7 and shows the line of contact of the stripper wire and the roller.

Referring again to the drawings, and to Figures 1 and 2 in particular, the apparatus constructed in accordance with the present invention is illustrated and is seen to comprise the following generally indicated parts: a frame 11 upon which is mounted a filler dispenser unit 12, an applicator or roller 13 which may be viewed as a functional part of unit 12, an actuator assembly 14 adapted to position the filler flow-controlling means of dispenser 12, and a control assembly 16 responsive to the passage of dough units relative to the filler apparatus to energize and de-energize assembly 14. Assemblies 14 and 16 may, if desired, be viewed as parts of a control unit effective to position the flow-controlling means of the dispenser unit.

The frame 11 is seen to comprise two spaced side casings 17 and 18 rigidly retained in spaced parallel relationship by transverse tie rods 19 and 21 connecting their opposite ends. The casings 17 and 18 are adapted to rest upon the spaced parallel frame members 22 and 23 of a bakery apparatus of the type disclosed in my application Serial No. 735,070. Small pins 24 are rigidly affixed to the bottom of casings 17 and 18 at one end thereof and extend downwardly to fit in positioning seats 24a in the upper surface of frame members 22 and 23. To raise and lower the opposite ends of the casings 17 and 18 there is provided an elevating device comprising a transverse shaft 26 extending through supporting brackets 27 and 28 mounted in the inside walls of casings and carrying supporting cams 29 and 31 resting directly on frame members 22 and 23. By rotating shaft 26, and so connecting cams 29 and 31, the end of the filler unit, and the adjacent roller 13, are raised or lowered as points of greater or lesser radius on the periphery of the cams are brought into contact with the frame members. Rotation of the shaft 26 is accomplished manually by means of a gear 32 mounted on shaft 26 and an engaging worm 33 rigidly mounted on the lower end of a rotatable vertical shaft 34 housed in a fixed vertical sleeve 36. The threaded upper end of sleeve 36 is reduced and projects through a hole 37 in the top wall of casing 18. A nut 38 threaded onto the upper end of sleeve 36 clamps it against the casing wall. Shaft 34 extends upwardly through the sleeve and its projecting upper end carries an exteriorly knurled knob 39. Rotation of knob 39 turns shaft 34 and worm 33 whereupon gear 32 rotates and with it, shaft 26 carrying the cams 29 and 31.

Turning now to roller 13, and to Figure 2 in particular, it is seen that the filler unit receives its driving force from the power transmission chain 43 of the bakery apparatus extended parallel to and below the frame member 23. The links of chain 43 engage the teeth of one head of a double-headed sprocket 42 rotatably mounted on a shaft 41 and supported within and extended horizontally at the forward end of casing 17. The other head of double sprocket 42 is aligned with a spaced sprocket 46 mounted on a transverse shaft 47 and is connected to it by a chain 44. Shaft 47 extends across the unit between the casings 17 and 18 and is rotatably mounted in suitable brackets 48 and 49 mounted on the inside walls of the casings. The filler applying roller 13 is carried by shaft 47 between casings 17 and 18 and rotates with it to apply filler to the dough units passing below it on the conveyer belt 20.

Referring now to Figures 4 and 5, it is seen that roller 13 is positioned below a hopper 51 of filler dispenser unit 12 in spaced relationship to, and extended transversely of, conveyer belt 20. Filler hopper or container 51 may be fabricated of small gauge metal and includes side walls 53, the upper portions of which slope downwardly and inwardly and lower portions of which extend in parallel planes, and end walls 56 which slope downwardly and inwardly for their full height. The lower open end of the hopper, which may be referred to as its mouth, is indicated by the reference character 52. At the mouth the extremities of the opposing side walls 53 are arcuately shaped at 54 to conform with the cylindrical roller 13 and to form a fluid-tight joint. The straight lower edges of the end walls 56 are spaced somewhat from the roller 13 and carry longitudinal sealing flaps 57 and 58 of resilient material which extend downwardly below the walls and then inwardly toward each other in overlying relationship to the roller end wall. The flaps slide on roller 13 as it is rotated and each forms a normally closed gate cooperating with roller 13 to close aperture 52.

Filler container 51 is supported on casings 17 and 18 by means including side flanges or brackets 61. The latter are generally rectangular and each carries at each of its outer ends the threaded shanks of a supporting pin 63 provided in each instance with a lock nut 64 by which it may be locked in fixed adjustment with respect to the plate. The pins 63 extend downwardly from plate 61 and each is formed near its lower end with a flange or shoulder 66 which rests on the top wall of the underlying casing 17 or 18 while the lower extremity of the pins at at least one end of the plate 61 extends into a positioning aperture seat 69 in the same top wall. The securing bolts 68 on the opposite sides of hopper 51 carry knurled knobs 71 and extend downwardly through plate 61 to seat threadedly in nuts 72 fixed to the undersides of the top wall of casings 17 and 18. In their fully threaded position securing bolts 68 clamp plate 61 to casings 17 and 18 at a height determined by the adjustment of spacing pins 63.

Referring now to the dispenser actuating assembly 14, it is to be noted that filler is released from container 51 of dispenser 12 to roller 13 by displacing the free edge of flexible resilient flap 57 from its sliding contact with the roller to permit the filler to travel under the flap with the moving surface of the roller and so be carried to the dough piece traveling thereunder. Displacement of flap 57 is accomplished by the pivotal movement of a plurality of flap-contacting fingers 74 which, together with their supporting rotatable shaft 77 and its solenoid-operated actuating lever 81, comprise the dispenser-actuating assembly 14. Rotatable shaft 77 extends transversely between two supporting brackets 78 and 79 mounted on the inner side walls of casings 17 and 18, respectively, and the plurality of fingers 74 are fixed to it by wing headed set screws 76 at spaced intervals between those brackets. At its end within casing 18 shaft 77 extends through bracket 79 and fixedly carries the center of an L-shaped lever 81 which has two arms. One of those arms is bifurcated at its free end to form a bracket 82 slidingly straddling a stem 84 pivotally connected at its lower end of the displaceable armature core 89 of an electric solenoid 88. The other arm of lever 81 is connected to a coil spring 87 the other end of which is fixed to the casing of solenoid 88. A second coil spring 83 encircles stem 84 between the bifurcated end 82 of the lever 81 and the upper end of armature 89 to force the lever against the lower end of knob 86 threadedly seated on the upper end of the stem where it projects through the top wall of casing 18. The upper end of knob 86 is enlarged to prevent its displacement through the top wall of casing 18. As the knob moves with the solenoid armature and stem 84, its position on the stem determines the extent of downward displacement by the contact of the underside of its head with the top of the casing. When solenoid 88 is energized its core 89 and connected stem 84 travel downwardly pivoting lever 81 counterclockwise, as viewed in Figure 1, against the tension of spring 87. This pivotal movement of lever 81 rotates shaft 77 and attached fingers 74, the latter displacing flap 57 from its "closed" position shown in Figure 5 to its "open" position shown in Figure 6. To vary the extent of arcuate displacement of flap 57 which takes place upon the energization of coil 88 knob 86 may be threaded upwardly or downwardly on stem 84 to vary the angular position of L-shaped lever 81. Referring now to the controller assembly 16 which actuates dispenser control assembly 14 through controlling the energization of solenoid 88, it is seen that the latter is energized by the closure of two normally open microswitches 91 and 92 which are connected in series with solenoid 88 between line 93, 94, as shown diagrammatically in Figure 3. Each microswitch has a supporting bracket 96 pivotally mounted at one of its ends to the inner wall of the casing 18 and supported at the other of its ends by a threaded headed bolt 99 extended downwardly through the top wall of the casing and threaded into a seat 98 in the bracket. A coil spring 101 encircling each bolt 99 between the casing top wall and the bracket 96 forces the latter downwardly from the casing top wall as far as permitted by the adjustment of the bolt. Each of the microswitches includes a spring-loaded downwardly extending detent 103 positioned as to be contacted by its operating lever 106 or 104. Levers 104 and 106 are mounted for pivotal movement with shafts 102 and 107, respectively, each of which extends transversely between casings 17 and 18 and is rotatably mounted therein. Each shaft carries one or more actuating fingers 110, as illustrated in Figure 2, connected to the shafts by means of connectors or brackets 112 each of which includes an adjustable set screw 114 by which the length of the actuating fingers can be adjusted. The ends of fingers 110 are bent at right angles to form a stub axle for a roller 117 which normally contacts the conveyer belt 119 positioned therebelow in the manner disclosed in my application Serial No. 735,010. When a flat unit of dough is on conveyer belt 119 it is carried under a roller 117, the latter being displaced upwardly to ride on the surface of the dough effecting the pivoting of the connected finger 110. The dough pieces first contact the roller 117 connected by an arm 110 to shaft 102 and then the roller similarly connected to shaft 107. This pivotal movement of the finger rotates shafts 102 and 107 in a counterclockwise direction, pivoting levers 104 and 106 away from their contacting positions with the spring-loaded detents 103 of microswitches 91 and 92. The normally open microswitches thereupon close. Upon the closing of both switches 92 and 91 solenoid 88 is energized and lever 81 and its attached shaft 77 pivoted in a counterclockwise direction as viewed in Figure 2. Upon shaft 77 pivoting counterclockwise the dispensing fingers 74 displace flap 57 to the position shown in Figure 6 permitting filler to flow with the roller 13 which carries it to the surface of the passing dough units.

It is imperative that the filler being fed from the dispenser container 51 be applied by the roller 13 to the passing dough unit and not to the conveyer belt. It is this requirement that makes necessary the use of a plurality of dough-contacting fingers and rollers spaced longitudinally of the belt. It should be noted that the leading edge of the dough unit must take the same time to leave the trailing roller 117 and travel to its point of contact with the applicator roller 13 as that required for the leading point on the roller on which filler is deposited to travel from flap 57 to the point at which it is to meet the dough unit. If conveyer belt 119 travels at the same linear speed as the surface of roller 13 then it is necessary only that the distance between trailing roller 117 and the point of filler application, that is, the point directly under roller 13, equal the circumferential distance around the surface of roller 13 between flap 57 and the point of application. This relationship is obtained precisely by varying the forward position of trailing roller 117 with respect to roller 13, the adjustment being obtained by loosening set screw 114 in finger-supporting bracket 113 and adjusting the length of finger 110 spacing the roller 117 from the shaft.

Referring now to Figure 3, it is seen that solenoid 88 is energized only when both switches 91 and 92 are closed, a condition which exists only when both leading and trailing rollers 117 are lifted by the dough unit. The passage of a dough unit under the rearward roller 117 alone does not energize the solenoid and instead the leading edge of the dough unit must pass under and pivot the fingers 110 connected to both shafts 102 and 107. The solenoid is de-energized, however, when the trailing edge of the dough unit has passed from under the leading roller 119. The use of two sets of rollers and fingers as described is particularly desirable in the manufacture of jelly rolls and the like in which it is desirable not to cover the last inch of the dough surface with filler, as the dough after being filled is wrapped on itself. To effect this result leading finger 110 is spaced from the trailing finger 119 a distance such that the switch controlled by the leading roller is opened to effect the de-energization of the solenoid 88 and the movement to closed position of the gate or flap 57 at such time that the last inch of the dough unit passing under the roller receives no filler. If the trailing roller is spaced from the lowermost point of the roller a distance equal to the circumferential distance separating that lowermost point from the flap 57, then the distance separating the leading roller from the lowermost point of the roller would be greater than the distance separating the traveling roller by a distance equal to the length of the dough unit to be uncoated, for example, one inch.

A dough-stripping wire 121 extends between eye-bolt supports 122 and 123 in sliding scraping contact with the central portion of the roller, as shown in Figures 5, 7, and 8. The wire 121 is positioned in non-parallel relationship to the axis of the roller, the support 123 being higher than support 122, and is contacted by the surface of the roller after the latter has contacted the dough on the conveyer belt serving to scrape dough pieces from the roller or even the entire dough unit should it adhere to the roller and tend to follow it rather than the belt.

In the operation of a filler machine constructed in accordance with the present invention the machine is positioned over the parallel frames 22 and 23 of a bakery apparatus of the character heretofore described. Pins 24 are inserted in their seats in frame members 22 and 23 and knob 39 is adjusted to elevate the apparatus above conveyer belt 119 to provide the optimum spacing between applicator 13 and the belt. That spacing depends upon the thickness of the dough units to which filler is to be applied. The position of actuator fingers 110 is then adjusted for the desired length of uncoated trailing surface, the distance between their rollers 117 corresponding to the length of unfilled surface on the dough units. Current conductors 127 are connected to a conventional power source and the driving unit of the bakery apparatus is started, the roller applicator 13 is rotated. Identical separate units of dough are deposited from a hopper, or other source, onto the traveling belt 119 at regular intervals. As each dough unit goes under the filling machine and successively displaces leading and trailing rollers 117, fingers 110 are pivoted, displacing switch contact levers 104 and 106 from their points of contact with the detents 103 of microswitches 91 and 92. The normally opened microswitches close, connecting solenoid 88 with power line 93, 94, and energize the solenoid. Core 89 of the solenoid is displaced, pivoting the connected lever 81 counterclockwise and causing fingers 74 to displace resilient gate flap 57 from its closing position. This permits the revolving applicator 13 to take filler from dispenser 12 and apply it to the surface of the dough unit 124 passing thereunder, as shown in Figure 5. Scraping wire 121 functions to prevent the dough unit from sticking to the filler-covered surface of roller 13 by wrapping itself thereon. Filler is applied uniformly to the surface of the dough unit until its trailing edge has passed from under the leading roller 117 causing finger 110 to pivot clockwise to open microswitch 92. The opening of microswitch 92 breaks the electrical circuit and de-energizes solenoid 88, allowing lever 81 to pivot clockwise under the urging of spring 87. This clockwise movement of the lever and its shaft pivots the fingers 74 from their position of contact with flap 57, which resiliently returns to its contacting position with applicator 13 closing aperture 52 in filler dispenser 12 and preventing further flow of filler to the applicator.

The last trailing portion of the dough surface reaches the applicator when the latter is free of filler and is therefore not covered. The process is repeated on following units of dough carried on conveyer belt 119.

While the particular apparatus herein shown and described in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claim.

I claim:

In a machine for applying filler to dough, the combination of a filler dispensing unit and a control unit therefor, said filler dispensing unit comprising a container formed with an aperture on its underside, a revolving cylinder positioned in said aperture and spaced from opposite edges thereof which are leading and trailing with respect to said cylinder, a trailing flexible flap affixed to the trailing edge of said container aperture, said trailing flexible flap normally sliding on said revolving cylinder to scrape the surface thereof free of filler as the cylinder surface travels out of said container, thus retaining said filler in said container, a leading flexible flap affixed to the leading edge of said container aperture, and sliding on said cylinder to form a seal between said container and said revolving cylinder to prevent filler escaping from said container, said revolving cylinder being positioned to contact the surface of batches of dough moving relative thereto, said control unit including a pair of spaced triggers arranged as to be actuated sequentially by the forward and trailing edges of a batch of dough moving relative thereto in the direction of said roller and prior to its contact therewith, said control unit also including a pair of microswitches each of which is connected to one of said triggers and actuated thereby, a solenoid connected in series by said microswitches to an electric power source and including a displaceable core, a tie rod affixed to said core and adapted to be moved thereby, a pivoted arm attached to said tie rod and adapted to be pivoted thereby, a pivotal shaft supporting said tie rod, fingers mounted on said pivotal shaft and contacting said trailing flexible flap of said dispensing unit, said triggers being adapted to be displaced sequentially by a moving dough unit to close said microswitches to direct current from said power source to said solenoid to displace said solenoid core to effect the displacement of said trailing flexible flap from its contact with said cylinder, whereupon filler may be transported from said container under said open flap by said revolving cylinder to said moving dough at its point of contact with the cylinder.

ROBERT M. LEHMAN.

REFERENCES CITED

The following references are of record in the file of this patent:

UNITED STATES PATENTS

| Number | Name | Date |
|---|---|---|
| 1,680,584 | Angell | Aug. 14, 1928 |
| 1,711,716 | Bausman | May 7, 1929 |
| 1,986,047 | Dawley et al. | Jan. 1, 1935 |
| 2,072,948 | Geffs | Mar. 9, 1937 |
| 2,182,068 | Clark | Dec. 5, 1939 |
| 2,188,485 | Quick | Jan. 30, 1940 |
| 2,463,570 | Speicher | Mar. 8, 1949 |
| 2,472,650 | Curlee | June 7, 1949 |
| 2,585,330 | Kayser | Feb. 12, 1952 |